Jan. 14, 1964   S. GOEBEL ETAL   3,117,953
APPARATUS FOR PURIFYING HIGH PRESSURE POLYETHYLENE
Filed Feb. 5, 1960
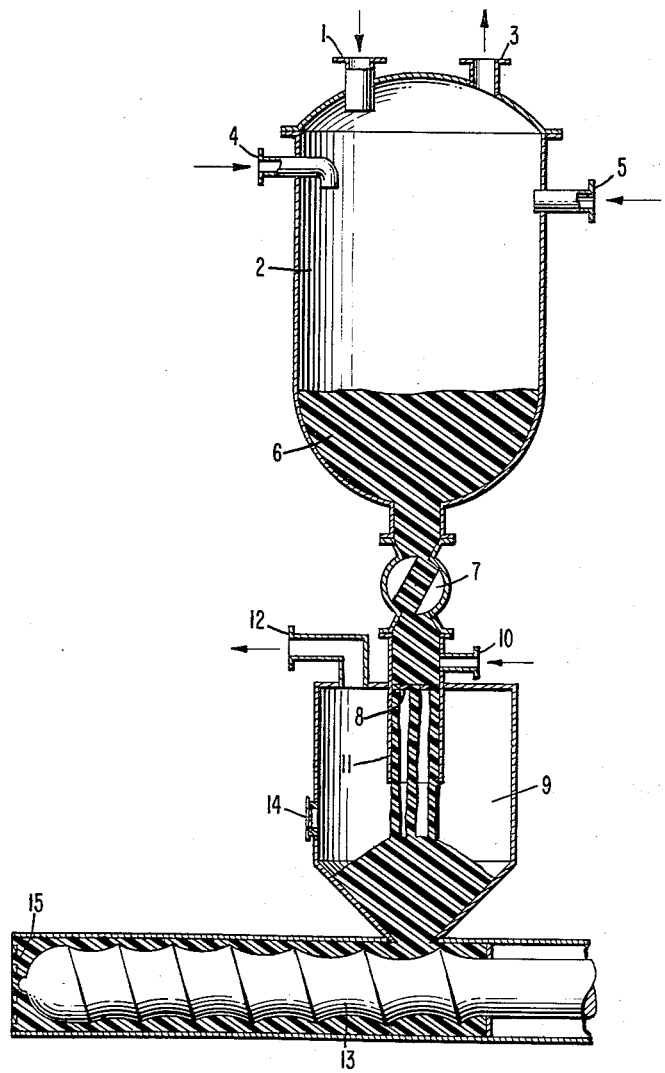
INVENTORS
SIEBERT GOEBEL,
MANFRED HAEBERLE,
WIELAND ZACHER,
GEORG SCHMIDT-THOMEE
BY
ATTORNEY United States Patent Office 3,117,953
Patented Jan. 14, 1964

3,117,953
APPARATUS FOR PURIFYING HIGH PRESSURE POLYETHYLENE
Siebert Goebel, Ludwigshafen (Rhine), Manfred Haeberle, Mannheim, Wieland Zacher, Ludwigshafen (Rhine), and Georg Schmidt-Thomée, Heidelberg, Germany, assignors to Badische Anilin- & Soda-Fabrik Aktiengesellschaft, Ludwigshafen (Rhine), Germany
Filed Feb. 5, 1960, Ser. No. 7,006
Claims priority, application Germany Feb. 7, 1959
3 Claims. (Cl. 260—94.9)

This invention relates to a specific method of withdrawing polyethylene, obtained by high pressure polymerization, from the manufacturing device, and to a process for the purification of such polyethylene. More particularly, the invention relates to conveying polyethylene manufactured by high pressure methods from the manufacturing device into the working up device and simultaneously substantially removing from the polyethylene volatile constituents. Furthermore, the invention relates to apparatus for carrying out the said process.

Polyethylene produced by conventional methods from ethylene at a pressure above 500 atmospheres and a temperature of between 150° and 400° C. in the presence of oxygen as the catalyst is known to contain as byproducts or impurities certain constituents which are gaseous under standard conditions and also constituents which still have a low molecular weight and therefore are volatile, but not gaseous under standard conditions. In the said conventional processes, the polyethylene, while passing from the manufacturing device through two pressure stages, is decompressed to atmospheric pressure. The plastic polyethylene is discharged from the separator which forms the second pressure stage at a pressure of about 2 to 5 atmospheres, the discharge of the polyethylene being effected by means of a cock. After complete decompression, the polyethylene which still has a temperature of 120° to 250° C., expands considerably owing to the escape of part of the gaseous constituents contained therein. At the same time a small quantity of the low molecular weight non-gaseous constituents contained in the polyethylene as byproducts from its manufacture evaporates from the surface of the polyethylene. The polyethylene is then conveyed to an extruder in the form of a non-transparent expanded mass, which is shaped into a band that lends itself for further processing. While being conveyed to the extruder the polyethylene is stripped of a further portion of the gaseous constituents still contained therein. A small amount of gaseous constituents and by far the greater part of the low molecular weight non-gaseous constituents remain in the product.

The low molecular weight constituents impair the properties of polyethylene considerably. They impart an unpleasant odor to the product and cause blocking of films prepared therefrom.

One feature of the said prior art processes is that the polyethylene comes into intimate contact with atmospheric oxygen while being processed in the extruder. This contact is especially intimate in the degasification zone of the extruder which is preferably located in the first part thereof adjacent to the feed opening. Here the air, which has been sucked in together with the plastic expanded polyethylene, is forced back to the feed opening in a direction countercurrent to the flow of the product. The polyethylene thereby undergoes disadvantageous changes since part of it is oxidatively degraded to polyethylene of lower molecular weight, i.e the properties of the product are unfavorably affected. At the same time another part of the polyethylene undergoes crosslinking, so that the product can be worked up only with difficulty. One disadvantage of the said crosslinking is the formation of so-called fish eyes which lead to rough surfaces and cloudy appearance of the finished polyethylene articles, e.g., blown films.

One object of the present invention is to provide a particularly advantageous method for withdrawing high-pressure polyethylene from the manufacturing device. Another object of the invention is to provide highly purified polyethylene which has been obtained by the high-pressure process. A more specific object of the invention is to provide degasified polyethylene. Another object of the invention is to provide a polyethylene from which the low molecular weight volatile constituents have been substantially removed.

A further object of the invention is to provide polyethylene which does not undergo undesirable changes after its production by the high-pressure process and which yields finished articles of high quality. Another object is to provide a polyethylene which, following its manufacture, can be modified in a most advantageous manner by blending it with suitable substances.

These and other objects and advantages of the invention are achieved by a process which comprises subjecting the polyethylene, after withdrawing it from the high-pressure manufacturing device and after feeding it to a separator wherein substantial amounts of gaseous substituents are removed, to reduced pressure in a degasification chamber while still in plastic condition, thereby removing volatile constituents, and then feeding the polyethylene thus treated to an extruder while avoiding access of air.

In accordance with our invention these objects are achieved in a particularly convenient manner by employing a device whereby the polyethylene flow after leaving the separator is divided into a number of partial currents. The dividing means forms part of our invention. Another feature of our invention is a device for removing from the degasification chamber the volatile gaseous substances stripped from the polyethylene and for introducing into the said chamber substances, which it is desired to admix to the polyethylene.

Our invention will be more readily understood and the advantages thereof will become more apparent from the following description given with reference to the accompanying drawing which is an embodiment of the invention given by way of example.

The hot frothy polyethylene which still contains gaseous ethylene is forced through a pipe 1, connected to the outlet from the manufacturing device, into a separator 2. Gas formed in the separator 2 during the decompression by reason of the lowered pressure is withdrawn through a pipe 3 together with steam which has been introduced into the separator 2 through a pipe 4 for the purpose of accelerating the removal of low molecular weight substances dissolved in the polyethylene together with the monomers. In order to improve the properties of the polyethylene there may be introduced through a pipe 5 into the separator 2 a polymer which is miscible with the polyethylene, as for example polyisobutylene, which then becomes dispersed in the polyethylene already present.

The partly degasified polyethylene collects at the bottom of the separator 2 at 6 and flows under slight pressure through a cock 7 at the outlet from the separator and through a sieve plate 8 into a degasification chamber 9. The product flowing through the cock 7 and the sieve plate 8 forms a vacuum-tight closure to the top of the degasification chamber 9. The bottom of the degasification chamber 9 is closed in a vacuum-tight manner by the plastic or solidified polyethylene which is compressed at the outlet opening 15 or at the stuffing box of the subsequent extruder 13.

During passage through the sieve plate 8, the polyethylene is resolved into a number of partial currents. In this way it acquires a large surface. Between the cock 7 and the sieve plate 8 there is a pipe 10 for injection of water, steam or suitable solvents. The gas contained in the polyethylene leaves the surface of the individual currents under the action of the reduced pressure and is led away through a pipe 12, and this alone or in association with steam or the vapors of organic solvents serves as a vehicle for the low molecular weight substances contained in the polyethylene. The gas thus promotes the removal of the same from the polyethylene.

In order to prevent the polyethylene from being sucked into the suction pipe during the degasification, a tube 11 is provided in the degasification chamber 9 below the sieve plate 8, the mouth of the tube 11 being lower than the pipe 12 to which the suction pipe is attached. The sieve plate 8, degasification chamber 9 and tube 11 can be kept by suitable heating means at a temperature which is above the degasification temperature of polyethylene. The degasified polyethylene collects at the bottom of the degasification chamber 9 and is conveyed with exclusion of air into the extruder 13. Occurrences in the degasification chamber 9 can be observed through an inspection glass 14.

The special advantage of the process lies in the fact that the low molecular weight constituents are removed which are responsible for the unpleasant odor of the polyethylene and for the blocking of films prepared therefrom. Above all, however, the hot polyethylene does not come into contact with atmospheric oxygen. Oxidative degradation of the material to low molecular weight substances and also crosslinking are reliably prevented in this way. Polyethylene prepared according to this invention exhibits, when blown up into a film, a high transparency and also a good smooth surface which will not lead to blocking, and it has no unpleasant odor. Furthermore, cleaning of the interior of the extruder, which is otherwise very frequently necessary, can be dispensed with.

The new process has the advantage over a subsequent vacuum treatment of the product which has already been granulated and remelted, that the gas contained in the polyethylene and escaping therefrom during evacuation acts as a vehicle for removing the volatile low molecular weight substances contained in the product. In this way it is possible to remove the low molecular weight substances very easily.

It is a special advantage of the process according to this invention that it is not necessary to supply additional amounts of heat to the polyethylene during the vacuum treatment during conveyance from the plant.

The foregoing description of the present invention clearly demonstrates that it is possible, by adding substances, on the one hand substantially to purify the polyethylene and on the other hand to prepare it in an advantageous way for further processing and use, the quality of the product being higher than that of products prepared by other methods.

What we claim is:

1. A process for separating volatile low molecular weight by-products from high pressure polyethylene which comprises: expanding said polyethylene from the polymerization vessel into a separator; withdrawing gas formed by the partial decompression of said polyethylene from said separator; passing said molten polyethylene under pressure from said separator to a degasification zone held under reduced pressure; admixing a solvent vapor with said molten polyethylene in an area adjacent to said separator and before said polyethylene is passed into said degasification zone, said mixture being divided into a number of partial currents as it enters said degasification zone; and thereafter removing from said degasification zone said volatile low molecular weight by-products along with said solvent vapor.

2. A process as in claim 1 wherein steam is used as the solvent vapor.

3. In an apparatus including a separator for separating volatile components from polyethylene obtained by a high pressure polymerization with an inlet pipe for introducing steam into said separator; a degasification chamber at the lower end of said separator; an outlet pipe on said chamber for removing the degasification products; said degasification chamber being communicated with the separator by a vertical pipe; an extruder communicating with the lower end of said degasification chamber; a horizontal sieve in the feed opening of the degasification chamber adjacent the end of said vertical pipe; the improvements comprising: a pipe connected to and communicating with the vertical pipe between said separator and said degasification chamber to introduce steam, and a vertical tube extending into the degasification chamber, said tube communicating with said vertical pipe and terminating in said degasification chamber at a lower level than said outlet pipe through which the degasification products are withdrawn.

References Cited in the file of this patent

UNITED STATES PATENTS

| | | |
|---|---|---|
| 2,561,226 | Powers | July 17, 1951 |
| 2,766,224 | Bannon | Oct. 9, 1956 |
| 2,921,054 | Kennedy | Jan. 12, 1960 |
| 2,943,082 | Cottle | June 28, 1960 |
| 2,971,951 | Cines | Feb. 14, 1961 |